(12) United States Patent
Gruba et al.

(10) Patent No.: US 12,496,122 B2
(45) Date of Patent: Dec. 16, 2025

(54) ABLATION AND OCCLUSIVE SYSTEM

(71) Applicants: BOSTON SCIENTIFIC SCIMED, INC., Maple Grove, MN (US); MAYO FOUNDATION FOR MEDICAL EDUCATION AND RESEARCH, Rochester, MN (US)

(72) Inventors: Sarah Melissa Gruba, Vadnais Heights, MN (US); James P. Rohl, Prescott, WI (US); James A. Klos, Bay City, WI (US); John M. Edgell, Plymouth, MN (US); Douglas Dean Pagoria, Evergreen, CO (US); Samuel J. Asirvatham, Rochester, MN (US)

(73) Assignees: Boston Scientific Scimed, Inc., Maple Grove, MN (US); Mayo Foundation For Medical Education and Research, Rochester (MN)

( * ) Notice: Subject to any disclaimer, the term of this patent is extended or adjusted under 35 U.S.C. 154(b) by 1650 days.

(21) Appl. No.: 16/505,922

(22) Filed: Jul. 9, 2019

(65) Prior Publication Data
US 2020/0008870 A1    Jan. 9, 2020

Related U.S. Application Data

(60) Provisional application No. 62/695,518, filed on Jul. 9, 2018.

(51) Int. Cl.
*A61B 18/14*      (2006.01)
*A61B 17/12*      (2006.01)
(Continued)

(52) U.S. Cl.
CPC .... *A61B 18/1492* (2013.01); *A61B 17/12136* (2013.01); *A61B 18/082* (2013.01);
(Continued)

(58) Field of Classification Search
CPC ........... A61B 2017/00247; A61B 2018/00273; A61B 2018/0016; A61B 2018/00351;
(Continued)

(56) References Cited

U.S. PATENT DOCUMENTS

| 5,423,744 A | 6/1995 | Gencheff et al. |
| 5,961,513 A | 10/1999 | Swanson et al. |

(Continued)

FOREIGN PATENT DOCUMENTS

| WO | 2013040201 A2 | 3/2013 |
| WO | 2014189887 A2 | 11/2014 |

(Continued)

OTHER PUBLICATIONS

International Search Report and Written Opinion issued in PCT/US2017/058376, mailed Feb. 1, 2018, 11 pages.
(Continued)

*Primary Examiner* — Linda C Dvorak
*Assistant Examiner* — Christine A Dedoulis
(74) *Attorney, Agent, or Firm* — Seager, Tufte & Wickhem LLP

(57) ABSTRACT

An example medical system for ablating and occluding the left atrial appendage is disclosed. The example system includes a catheter sized and shaped for vascular access and including an elongate body extending between a proximal end and a distal end. A first expandable member may be positioned near the distal end of the elongate body and have a first region configured to permeate a liquid therethrough. A first set of one or more electrodes may be arranged within the first expandable member and may be configured to deliver energy to the tissue region. An occlusive implant may be releasably secured to the distal end of the elongate body.

15 Claims, 8 Drawing Sheets

(51) Int. Cl.
  *A61B 18/08* (2006.01)
  *A61B 18/12* (2006.01)
  *A61B 17/00* (2006.01)
  *A61B 18/00* (2006.01)
(52) U.S. Cl.
  CPC .............. *A61B 18/1206* (2013.01); *A61B 2017/00243* (2013.01); *A61B 2017/00477* (2013.01); *A61B 2017/00876* (2013.01); *A61B 2018/00059* (2013.01); *A61B 2018/0016* (2013.01); *A61B 2018/0022* (2013.01); *A61B 2018/00351* (2013.01); *A61B 2018/00577* (2013.01); *A61B 2018/00589* (2013.01); *A61B 2018/1253* (2013.01); *A61B 2018/126* (2013.01)
(58) Field of Classification Search
  CPC ........... A61B 2018/00577; A61B 2018/00238; A61B 2018/00261; A61B 17/12045; A61B 17/12136; A61B 5/6853
  See application file for complete search history.

(56) References Cited

U.S. PATENT DOCUMENTS

| | | | |
|---|---|---|---|
| 6,500,174 B1 | 12/2002 | Maguire et al. | |
| 6,529,756 B1* | 3/2003 | Phan | A61B 18/1492 606/49 |
| 7,674,259 B2 | 3/2010 | Shadduck | |
| 11,026,693 B2* | 6/2021 | DeMeritt | A61B 17/12177 |
| 2002/0188289 A1 | 12/2002 | Hegde | |
| 2005/0010207 A1 | 1/2005 | Swanson et al. | |
| 2005/0059065 A1 | 3/2005 | Brenner | |
| 2005/0065506 A1 | 3/2005 | Phan | |
| 2005/0209674 A1* | 9/2005 | Kutscher | A61M 25/1011 623/1.11 |
| 2007/0032787 A1 | 2/2007 | Hassett et al. | |
| 2009/0247933 A1 | 10/2009 | Maor et al. | |
| 2010/0256629 A1 | 10/2010 | Wylie et al. | |
| 2013/0030430 A1* | 1/2013 | Stewart | A61N 1/327 606/41 |
| 2014/0018794 A1* | 1/2014 | Anderson | A61B 18/1492 606/41 |
| 2014/0357956 A1 | 12/2014 | Salahieh et al. | |

FOREIGN PATENT DOCUMENTS

| | | |
|---|---|---|
| WO | 2016033170 A1 | 3/2016 |
| WO | 2016202708 A1 | 12/2016 |
| WO | 2018185255 A1 | 10/2018 |
| WO | 2018185256 A1 | 10/2018 |

OTHER PUBLICATIONS

International Search Report and Written Opinion dated Oct. 22, 2019 for International Application No. PCT/US2019/040936.

* cited by examiner

ABLATION AND OCCLUSIVE SYSTEM

CROSS-REFERENCE TO RELATED APPLICATIONS

This application claims the benefit of priority under 35 U.S.C. § 119 to U.S. Provisional Application Ser. No. 62/695,518, filed Jul. 9, 2018, the entirety of which is incorporated herein by reference.

BACKGROUND

The left atrial appendage (LAA) is a small organ attached to the left atrium of the heart as a pouch-like extension. In patients suffering from atrial fibrillation, the left atrial appendage may not properly contract with the left atrium, causing stagnant blood to pool within its interior, which can lead to the undesirable formation of thrombi within the left atrial appendage. Thrombi forming in the left atrial appendage may break loose from this area and enter the blood stream. Thrombi that migrate through the blood vessels may eventually plug a smaller vessel downstream and thereby contribute to stroke or heart attack. Clinical studies have shown that the majority of blood clots in patients with atrial fibrillation are found in the left atrial appendage. As a treatment, medical devices have been developed which are positioned in the left atrial appendage and deployed to close off the ostium of the left atrial appendage. Over time, the exposed surface(s) spanning the ostium of the left atrial appendage becomes covered with tissue (a process called endothelization), effectively removing the left atrial appendage from the circulatory system and reducing or eliminating the number of thrombi which may enter the blood stream from the left atrial appendage. A continuing need exists for improved medical devices and methods to control thrombus formation within the left atrial appendage of patients suffering from atrial fibrillation.

SUMMARY

This disclosure provides design, material, manufacturing method, and use alternatives for medical devices. In a first example, an ablation and implant system may comprise a catheter sized and shaped for vascular access and including an elongate body extending between a proximal end and a distal end, a first expandable member positioned near the distal end of the elongate body and having a first region configured to permeate a liquid therethrough, a first set of one or more electrodes arranged within the first expandable member and configured to deliver energy to the tissue region, and an occlusive implant releasably secured to the distal end of the elongate body.

Alternatively or additionally to any of the examples above, in another example, the system may further comprise a second expandable member and having a first region configured to permeate a liquid therethrough and positioned between the first expandable member and the occlusive implant and a second set of one or more electrodes arranged within the second expandable member.

Alternatively or additionally to any of the examples above, in another example, the first region of the first expandable member may be configured to transfer energy from the first set of one more electrodes to the tissue region.

Alternatively or additionally to any of the examples above, in another example, the system may further comprise a direct current source electrically coupled to the first set of one or more electrodes.

Alternatively or additionally to any of the examples above, in another example, the direct current source may be configured to deliver pulses of voltage in the range of about 1000 to about 5000 volts.

Alternatively or additionally to any of the examples above, in another example, the liquid may comprise at least one of saline, a pharmacological agent, an anti-stenotic agent, or contrast.

Alternatively or additionally to any of the examples above, in another example, the liquid may be electrically conductive.

Alternatively or additionally to any of the examples above, in another example, the second expandable member may be coupled to the elongate body.

Alternatively or additionally to any of the examples above, in another example, the second set of one or more electrodes may be configured to form a ground.

Alternatively or additionally to any of the examples above, in another example, the occlusive implant may have an electrically conductive region.

Alternatively or additionally to any of the examples above, in another example, the electrically conducive region of the occlusive implant may be configured to form a ground.

Alternatively or additionally to any of the examples above, in another example, the first expandable member and the second expandable member may be individually expandable.

Alternatively or additionally to any of the examples above, in another example, the system may further comprise a handle coupled to the proximal end of the elongate body.

Alternatively or additionally to any of the examples above, in another example, the system may further comprise a steering mechanism configured to direct the elongate body.

Alternatively or additionally to any of the examples above, in another example, the first set of one or more electrodes may be configured to deliver direct current at a rate of about 1 to about 100 pulses per heartbeat.

In another example, an ablation and implant system may comprise a catheter sized and shaped for vascular access and including an elongate body extending between a proximal end and a distal end, a first expandable member positioned near the distal end of the elongate body and having a first region configured to permeate a liquid therethrough, a first set of one or more electrodes arranged within the first expandable member and configured to deliver energy to the tissue region, and an occlusive implant releasably secured to the distal end of the elongate body.

Alternatively or additionally to any of the examples above, in another example, the system may further comprise a second expandable member and having a first region configured to permeate a liquid therethrough and positioned between the first expandable member and the occlusive implant and a second set of one or more electrodes arranged within the second expandable member.

Alternatively or additionally to any of the examples above, in another example, the first region of the first expandable member may be configured to transfer energy from the first set of one more electrodes to the tissue region.

Alternatively or additionally to any of the examples above, in another example, the system may further comprise a direct current source electrically coupled to the first set of one or more electrodes.

Alternatively or additionally to any of the examples above, in another example, the direct current source may be configured to deliver pulses of voltage in the range of about 1000 to about 5000 volts.

Alternatively or additionally to any of the examples above, in another example, the first set of one or more electrodes may be configured to deliver direct current at a rate of about 1 to about 100 pulses per heartbeat.

Alternatively or additionally to any of the examples above, in another example, the liquid may comprise at least one of saline, a pharmacological agent, an anti-stenotic agent, contrast agent, or mixture thereof.

Alternatively or additionally to any of the examples above, in another example, the liquid may be electrically conductive.

Alternatively or additionally to any of the examples above, in another example, the second expandable member may be coupled to the elongate body.

In another example, a method for applying ablation therapy to a tissue region within a patient's heart and delivering an occlusive implant may comprise navigating a catheter within the patient's heart, the catheter including an elongate body extending between a proximal end and a distal end, positioning and expanding a first expandable member having one or more electrodes and an occlusive implant at the tissue region, the first expandable member and the occlusive implant being positioned near the distal end of the elongate body, delivering a direct current energy to the tissue region through the one or more electrodes, and deploying the occlusive implant adjacent to the tissue region.

Alternatively or additionally to any of the examples above, in another example, the direct current energy may be delivered at a voltage in the range of about 1000 volts to about 5000 volts.

Alternatively or additionally to any of the examples above, in another example, the direct current energy may be delivered at a rate of about 1 to about 100 pulses per heartbeat.

Alternatively or additionally to any of the examples above, in another example, the first expandable member may include a first region configured to permeate a liquid therethrough, the first region positioned over the one or more electrodes.

Alternatively or additionally to any of the examples above, in another example, the method may further comprise mapping the electrical activity of the tissue region after delivering the direct current energy.

In another example, a method for applying ablation therapy to a tissue region within a patient's heart and delivering an occlusive implant may comprise navigating a catheter within the patient's heart, the catheter including an elongate body extending between a proximal end and a distal end, positioning and expanding a first expandable member having one or more electrodes and a second expandable member having one or more electrodes at the tissue region, the first expandable member and the second expandable member being positioned near the distal end of the elongate body, delivering a direct current energy to the tissue region through the one or more electrodes of the first expandable member. After delivering the direct current energy, the method may further comprise removing the catheter from the patient's heart, releasably coupling an occlusive implant to the distal end of the elongate body, navigating the catheter to the tissue region, and deploying the occlusive implant adjacent to the tissue region.

Alternatively or additionally to any of the examples above, in another example, the direct current energy may be delivered at a voltage in the range of about 1000 volts to about 5000 volts.

Alternatively or additionally to any of the examples above, in another example, the direct current energy may be delivered at a rate of about 1 to about 100 pulses per heartbeat.

Alternatively or additionally to any of the examples above, in another example, the first expandable member may include a first region configured to permeate a liquid therethrough, the first region positioned over the one or more electrodes.

Alternatively or additionally to any of the examples above, in another example, the second expandable member may include a first region configured to permeate a liquid therethrough, the first region positioned over the one or more electrodes.

Alternatively or additionally to any of the examples above, in another example, the method may further comprise mapping the electrical activity of the tissue region after delivering the direct current energy and before removing the catheter from the patient's heart.

The above summary of some embodiments is not intended to describe each disclosed embodiment or every implementation of the present disclosure. The Figures, and Detailed Description, which follow, more particularly exemplify these embodiments

BRIEF DESCRIPTION OF THE DRAWINGS

The disclosure may be more completely understood in consideration of the following detailed description of various embodiments in connection with the accompanying drawings, in which.

Figure 1:
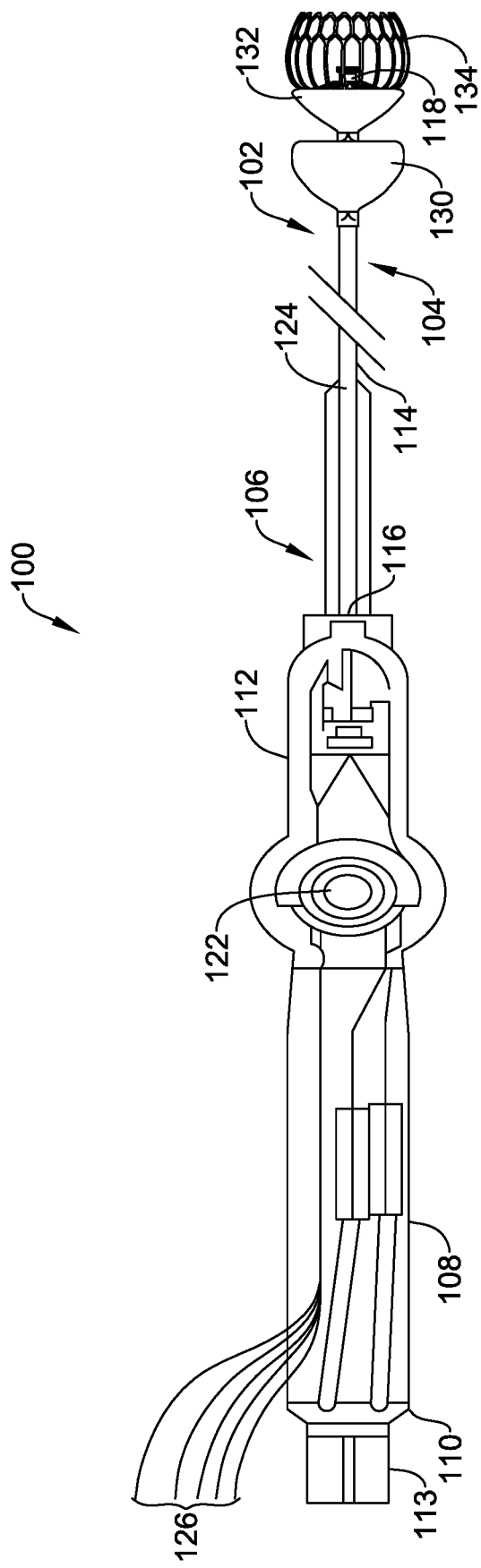
FIG. 1 is a plan view of an example ablation and implant system.

While aspects of the disclosure are amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION

The following description should be read with reference to the drawings, which are not necessarily to scale, wherein like reference numerals indicate like elements throughout the several views. The detailed description and drawings are intended to illustrate but not limit the claimed disclosure. Those skilled in the art will recognize that the various elements described and/or shown may be arranged in various combinations and configurations without departing from the scope of the disclosure. The detailed description and drawings illustrate example embodiments of the claimed disclosure. However, in the interest of clarity and ease of understanding, while every feature and/or element may not be shown in each drawing, the feature(s) and/or element(s) may be understood to be present regardless, unless otherwise specified.

For the following defined terms, these definitions shall be applied, unless a different definition is given in the claims or elsewhere in this specification.

All numeric values are herein assumed to be modified by the term "about," whether or not explicitly indicated. The term "about", in the context of numeric values, generally refers to a range of numbers that one of skill in the art would consider equivalent to the recited value (e.g., having the same function or result). In many instances, the term "about" may include numbers that are rounded to the nearest significant figure. Other uses of the term "about" (e.g., in a context other than numeric values) may be assumed to have their ordinary and customary definition(s), as understood from and consistent with the context of the specification, unless otherwise specified.

The recitation of numerical ranges by endpoints includes all numbers within that range, including the endpoints (e.g., 1 to 5 includes 1, 1.5, 2, 2.75, 3, 3.80, 4, and 5).

Although some suitable dimensions, ranges, and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. It is to be noted that in order to facilitate understanding, certain features of the disclosure may be described in the singular, even though those features may be plural or recurring within the disclosed embodiment(s). Each instance of the features may include and/or be encompassed by the singular disclosure(s), unless expressly stated to the contrary. For simplicity and clarity purposes, not all elements of the disclosure are necessarily shown in each figure or discussed in detail below. However, it will be understood that the following discussion may apply equally to any and/or all of the components for which there are more than one, unless explicitly stated to the contrary. Additionally, not all instances of some elements or features may be shown in each figure for clarity.

Relative terms such as "proximal", "distal", "advance", "retract", variants thereof, and the like, may be generally considered with respect to the positioning, direction, and/or operation of various elements relative to a user/operator/manipulator of the device, wherein "proximal" and "retract" indicate or refer to closer to or toward the user and "distal" and "advance" indicate or refer to farther from or away from the user. In some instances, the terms "proximal" and "distal" may be arbitrarily assigned in an effort to facilitate understanding of the disclosure, and such instances will be readily apparent to the skilled artisan. Other relative terms, such as "upstream", "downstream", "inflow", and "outflow" refer to a direction of fluid flow within a lumen, such as a body lumen, a blood vessel, or within a device.

The term "extent" may be understood to mean a greatest measurement of a stated or identified dimension, unless the extent or dimension in question is preceded by or identified as a "minimum", which may be understood to mean a smallest measurement of the stated or identified dimension. For example, "outer extent" may be understood to mean a maximum outer dimension, "radial extent" may be understood to mean a maximum radial dimension, "longitudinal extent" may be understood to mean a maximum longitudinal dimension, etc. Each instance of an "extent" may be different (e.g., axial, longitudinal, lateral, radial, circumferential, etc.) and will be apparent to the skilled person from the context of the individual usage. Generally, an "extent" may be considered a greatest possible dimension measured according to the intended usage, while a "minimum extent" may be considered a smallest possible dimension measured according to the intended usage. In some instances, an "extent" may generally be measured orthogonally within a plane and/or cross-section, but may be, as will be apparent from the particular context, measured differently—such as, but not limited to, angularly, radially, circumferentially (e.g., along an arc), etc.

The terms "monolithic" and "unitary" shall generally refer to an element or elements made from or consisting of a single structure or base unit/element. A monolithic and/or unitary element shall exclude structure and/or features made by assembling or otherwise joining multiple discrete elements together.

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect the particular feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement and/or enrich the described embodiment(s), as would be understood by one of ordinary skill in the art.

For the purpose of clarity, certain identifying numerical nomenclature (e.g., first, second, third, fourth, etc.) may be used throughout the description and/or claims to name and/or differentiate between various described and/or claimed features. It is to be understood that the numerical nomenclature is not intended to be limiting and is exemplary only. In some embodiments, alterations of and deviations from previously-used numerical nomenclature may be made in the interest of brevity and clarity. That is, a feature identified as a "first" element may later be referred to as a "second" element, a "third" element, etc. or may be omitted entirely, and/or a different feature may be referred to as the "first" element. The meaning and/or designation in each instance will be apparent to the skilled practitioner.

The occurrence of thrombi in the left atrial appendage (LAA) during atrial fibrillation may be due to stagnancy of blood pooling in the LAA. The pooled blood may still be pulled out of the left atrium by the left ventricle, however less effectively due to the irregular contraction of the left atrium caused by atrial fibrillation. Therefore, instead of an active support of the blood flow by a contracting left atrium and left atrial appendage, filling of the left ventricle may depend primarily or solely on the suction effect created by the left ventricle. However, the contraction of the left atrial appendage may not be in sync with the cycle of the left ventricle. For example, contraction of the left atrial appendage may be out of phase up to 180 degrees with the left ventricle, which may create significant resistance to the desired flow of blood. Further still, most left atrial appendage geometries are complex and highly variable, with large irregular surface areas and a narrow ostium or opening compared to the depth of the left atrial appendage. These aspects as well as others, taken individually or in various combinations, may lead to high flow resistance of blood out of the left atrial appendage.

In an effort to reduce the occurrence of thrombi formation within the left atrial appendage and prevent thrombi from entering the blood stream from within the left atrial appendage, it may be desirable to develop medical devices and/or occlusive implants that close off the left atrial appendage from the heart and/or circulatory system, thereby lowering the risk of stroke due to thromboembolic material entering the blood stream from the left atrial appendage. In some instances, these devices or implants may become dislodged due to LAA movement from electrical contractions in the LAA. In some cases, ablating the LAA may prevent these contractions which dislodge the device. Example medical devices and/or occlusive implants that ablate and/or close off the left atrial appendage are disclosed herein.

FIG. 1 shows an exemplary ablation and implant system 100. The system 100 may include a catheter 102 sized and shaped for vascular access. The catheter 102 includes a distal end region 104 and a proximal end region 106. In some embodiments, the proximal end region 106 of the catheter 102 may be coupled to a handle 108 having a proximal portion 110 and a distal portion 112. A physician may manipulate the ablation system 100 via the handle 108 during a treatment procedure involving ablation and/or delivery of an implant. The handle 108 may include a plurality of conduits, conductors, and wires to facilitate control of the catheter 102 and/or mating of the catheter 102 with a source of fluid, a source of ablative energy, a source of mapping, temperature display, sensors, and/or control software/hardware. The handle 108 may further include a connection port 113 through which ablative energy source and a mapping energy source may be operably coupled. In some instances, the ablative energy source and/or the mapping energy source may be configured to measure impedance at the ablation site which may be used to determine when the ablation procedure is complete. For example, during an ablation procedure, the impedance may change as the tissue begins to die. In some cases, the impedance may drop and then level off when the adjacent cells have been completely electroporated.

The catheter 102 can include an elongate body 114 having a proximal end 116 and a distal end 118. The elongate body 114 may house electrical conductors/cable assembly (e.g., wires) for transmitting sensed signals and/or ablation energy. In some embodiments, the elongate body 114 may include a circular cross-sectional geometry. However, other cross-sectional shapes, such as elliptical, rectangular, triangular, and various other shapes, can be provided. The elongate body 114 may include one or more lumens for receiving fluids, control wires, conductive wires, release mechanisms, etc. In certain instances, the elongate body 114 may be preformed of an inert, resilient material that retains its shape and does not soften significantly at body temperature; for example, but not limited to, Pebax™, polyethylene, or Hytrel™ (polyester). The elongate body 114 may be made of a variety of materials, including, but not limited to, metals and polymers. The elongate body 114 may be flexible and capable of winding through a tortuous path that leads to a target site, for example, an area within or near the heart. The elongate body 114 may also be semi-rigid, for example, by being made of a stiff material, or by being reinforced with a coating or coil, to limit the amount of flexing.

In some embodiments, the movement of the distal end 118 of the elongate body 114 (such as to navigate through the tortuous path that leads to a target site) can be controlled by a control mechanism 122 included within the handle 108. The system 100 can include an articulating section of the elongate body 114 (e.g., near the distal end 118) that is controlled via the control mechanism 122. The distal end 118 of the elongate body 114 may be deflected or bent. The articulation section of the body may facilitate insertion of the catheter 102 through a body lumen (e.g., vasculature) and/or placement of electrodes and/or implant at a target tissue location. The articulation may provide one or more degrees of freedom and permit up/down and/or left/right articulation. Additionally, or alternatively, the elongate body 114 may be advanced over a guidewire (not explicitly shown) to direct the distal end 118 to the target site.

The distal end region 104 of the catheter 102 may include a proximal expandable member 130, a distal expandable member 132, and an occlusive implant 134. As will be described in more detail herein, in various arrangements one or more of the proximal expandable member 130, the distal expandable member 132, or the occlusive implant 134 may be omitted. The proximal expandable member 130 and the distal expandable member 132 may include one or more electrode structures 140, 142 (see, for example, FIG. 2). The electrode structures 140, 142 and/or the occlusive implant 134 may be configured to conduct radio frequency (RF) energy or direct current to form lesions during the ablation procedure. The electrode structures 140, 142 and/or the occlusive implant 134 may deliver ablation energy (and/or complete the circuit) to the LAA or adjacent tissue to reduce or eliminate contractions in the LAA that may dislodge an occlusive implant, such as the occlusive implant 134 shown in FIG. 1. Each of the electrode structures 140, 142 (and/or the occlusive implant 134) may be coupled to wires 126 using suitable means, such as soldering or welding. In some embodiments, the wires 126 can pass through a lumen 124 extending through the elongate body 114 of the catheter 102. In other embodiments, the wires 126 may be embedded within a side wall of the elongate body 114. The wires 126 may be electrically coupled to the RF generator or direct current source exteriorly coupled to the ablation system 100. In some instances, the occlusive implant 134 may be formed from a conductive material, or include conductive regions to form a ground or return path.

Figure 2:
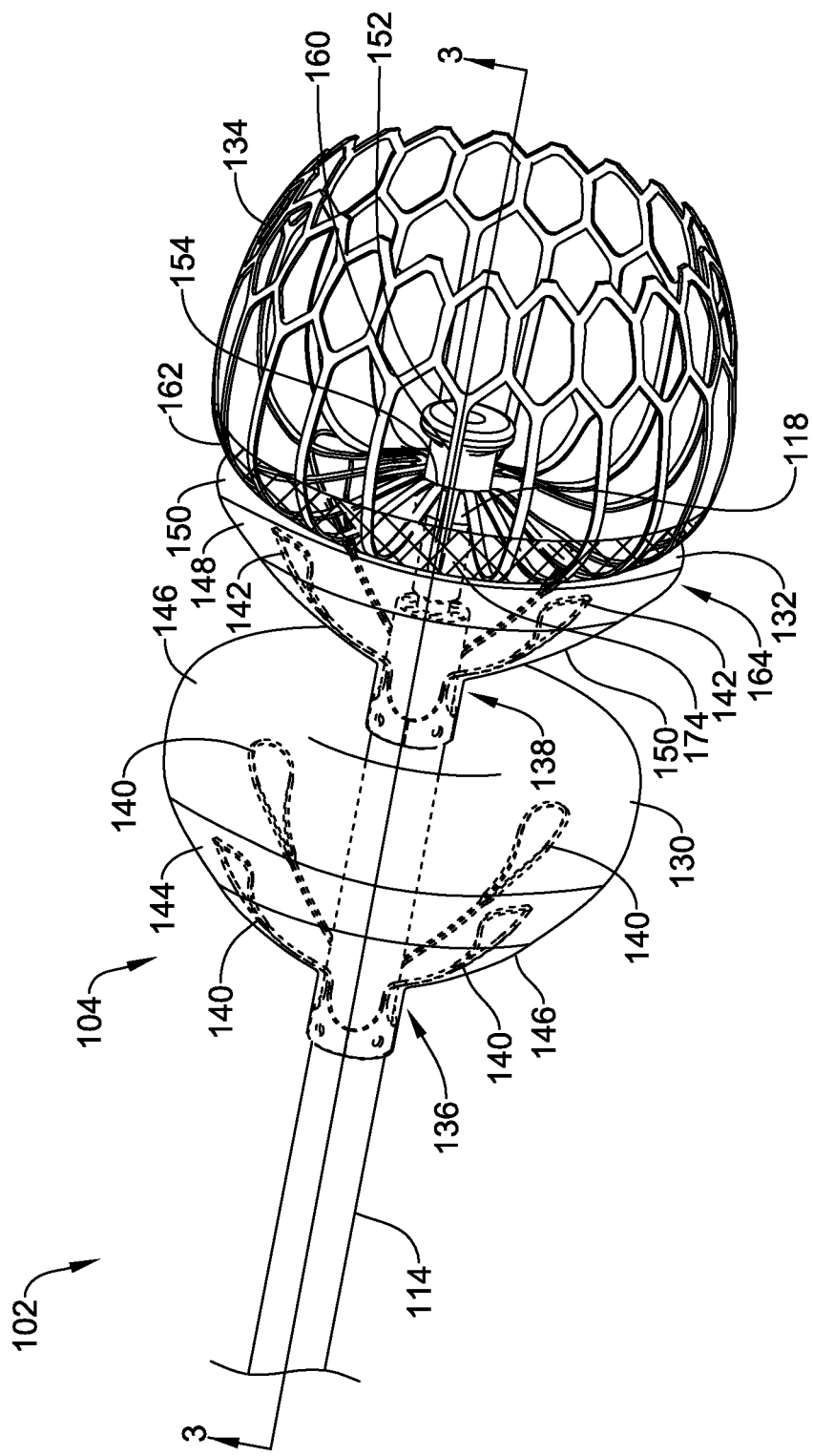
FIG. 2 illustrates a perspective view of a distal end region of the example ablation and implant system shown in FIG. 1.

FIG. 2 illustrates a perspective view of the distal end region 104 of the catheter 102 of the ablation and implant system 100. The distal end region 104 may be configured to ablate the LAA, or other target tissue, in a manner that does not cause harmful damage to surrounding tissues. In some instances, the ablation method may include irreversible electroporation (IRE). IRE is a controlled non-thermal ablation technique that uses nano-second to micro-second high voltage pulses to form pores in the membranes of the adjacent cells. In some instances, the pulses may be in the range of about 1 to about 100 microseconds. However, the pulses may be shorter than 1 microsecond (e.g., in the nanosecond range) or longer than 100 microseconds, as desired. Further, the pulses may be monopolar or bipolar pulses. If the pores become wide enough, the cell is unable to repair itself and dies naturally (e.g., apoptotic cell death). This technique may allow for endothelization to occur over and/or around the occlusive implant 134. However, other ablation techniques may also be used. As will be described in more detail herein, the LAA may be ablated using IRE, such as before or during installation of the occlusive implant 134.

As described above, the distal end region 104 of the catheter 102 may include a first, or proximal, expandable member 130, a second, or distal expandable member 132, and an occlusive implant 134. The proximal expandable member 130 may be expanded from a collapsed delivery configuration (not explicitly shown) to the expanded configuration illustrated in FIG. 2. The proximal expandable member 130 may include one or more electrode structures 140 positioned within an interior of the expandable member 130. In some instances, the one or more electrode structures 140 may form a set of electrode structures. The set of electrode structures 140 may be operated as a unit, as sub-groups of less than all of the electrode structures 140 forming the set, or individually, as desired. The set of electrode structures 140 may be formed from a single unitary structure or a plurality of individual structures, as desired. The electrode structures 140 may be arranged about a circumference of an interior surface of the proximal expandable member 130. In some instances, the electrode structures 140 may be spaced equidistantly about the circumference of the proximal expandable member 130 while in other instances, the electrode structures 140 may be eccentrically spaced, as desired. The electrode structures 140 may be configured as mapping electrodes, impedance measuring electrodes, and/or ablation electrodes.

Similarly, the distal expandable member 132 may be expanded from a collapsed delivery configuration (not explicitly shown) to the expanded configuration illustrated in FIG. 2. The distal expandable member 132 may include one or more electrode structures 142 positioned within an interior of the distal expandable member 132. In some instances, the one or more electrode structures 142 may form a set of electrode structures. The set of electrode structures 142 may be operated as a unit, as sub-groups of less than all of the electrode structures 142 forming the set, or individually, as desired. The set of electrode structures 142 may be formed from a single unitary structure or a plurality of individual structures, as desired. The electrode structures 142 may be arranged about a circumference of an interior surface of the distal expandable member 132. In some instances, the electrode structures 142 may be spaced equidistantly about the circumference of the distal expandable member 132 while in other instances, the electrode structures 142 may be eccentrically spaced, as desired. The electrode structures 142 may be configured as mapping electrodes, impedance measuring electrodes and/or ablation electrodes.

In one illustrative embodiment, one or both sets of the electrode structures 140, 142, and/or the occlusive implant 134 may also be configured to measure the localized intracardial electrical activity (e.g., map) in real time at the point of RF energy delivery. The electrode structures 140, 142 may allow the physician to ascertain lesion formation by measuring the electrical activity of the tissue having been in contact with an ablation electrode (e.g., the lack of electrical activity indicates ablated tissue, whereas the presence of electrical activity indicates live or non-ablated tissue). In certain instances, the wires 126, coupled to the electrode structures 140, 142, may also be electrically coupled to a mapping signal processor such that electrical events in myocardial tissue can be sensed for the generation of electrograms, monophasic action potentials (MAPs), isochronal electrical activity maps, and the like. It is contemplated that one set of electrode structures 140, 142 may be ablation electrodes while the other set of electrode structures 140, 142 may be mapping electrodes. However, this is not required. It is contemplated that both sets of electrode structures 140, 142 may have dual functionality.

The proximal and distal expandable members 130, 132 may be configured to inflate in response to a liquid or inflation medium being provided thereto. In some embodiments, the proximal expandable member 130 and the distal expandable member 132 may be separately inflated using two inflation medium sources or proximal expandable member 130 and the distal expandable member 132 may be inflated using a single inflation medium.

In some instances, the proximal expandable member 130 may include regions of differing permeability. For example, the proximal expandable member 130 may include a first region 144 having a first permeability and one or more second regions 146 having a second permeability. The first permeability may differ from the second permeability. More specifically, the first permeability may be greater than the second permeability such that a liquid may exude, elute, weep, or otherwise be transmitted from or through the first region 144. As a result and in certain instances, the first region 144 of the proximal expandable member 130 may be configured to permeate a liquid therethrough. As the proximal expandable member 130 is inflated, the liquid may permeate therethrough at the first region 144. The liquid may be saline, a pharmacological agent, an anti-stenotic agent, contrast, or a combination thereof. In some embodiments, the first region 144 may be an annular region positioned over or adjacent to the electrode structures 140 such that an electrical current may be conducted from (or to) the electrode structures 140 to (or from) another electrically conductive element (e.g., the electrode structures 142 of the distal expandable member 132 or the occlusive implant 134). For example, the liquid permeating from the first region 144 may be electrically conductive so as to provide an electrical path from the electrode structures 140 positioned interior of the proximal expandable member 130 to a point exterior to the proximal expandable member 130 or from a point exterior of the proximal expandable member 130 to the electrode structures 140 interior to the proximal expandable member 130. However, it is contemplated that the first region 144 may be positioned in other configurations, as desired. In one example, the first region 144 may extend from a proximal end region 136 of the proximal expandable member 130 towards a distal end region 138 of the proximal expandable member 130 to a point adjacent to a distal end region of the electrode structures 140.

In some instances, the distal expandable member 132 may include regions of differing permeability. For example, the distal expandable member 132 may include a first region 148 having a first permeability and one or more second regions 150 having a second permeability. The first permeability may differ from the second permeability. More specifically, the first permeability may be greater than the second permeability such that a liquid may exude, elute, weep, or otherwise be transmitted from or through the first region 148. As a result and in certain instances, the first region 148 of the distal expandable member 132 may be configured to permeate a liquid therethrough. As the proximal expandable member 130 is inflated, the liquid may permeate therethrough at the first region 148. The liquid may be saline, a pharmacological agent, an anti-stenotic agent, contrast, or a combination thereof. In some embodiments, the first region 148 may an annular region positioned over or adjacent to the electrode structures 142 such that an electrical current may be conducted from (or to) the electrode structures 142 to (or from) another electrically conductive element (e.g., the electrode structures 140 of the proximal expandable member 130 or the occlusive implant 134). For example, the liquid permeating from the first region 148 may be electrically conductive so as to provide an electrical path from the electrode structures 142 positioned interior of the distal expandable member 132 to a point exterior to the distal expandable member 132 or from a point exterior of the distal expandable member 132 to the electrode structures 142 interior to the distal expandable member 132. However, it is contemplated that the first region 148 may be positioned in other configurations, as desired. In one example, the first region 148 may extend from a proximal end region 138 of the distal expandable member 132 to a point adjacent to a distal end region of the electrode structures 142.

The occlusive implant 134 may include a self-expanding frame structure 152. The frame structure 152 may be expandable from a collapsed configuration (not explicitly shown) to the expanded configuration illustrated in FIG. 2. The frame structure 152 may be formed from Nitinol, or other material configured to resume a predetermined shape in the absence of an applied force. While the occlusive implant 134 is described and shown as having a frame structure 152, it is contemplated that the occlusive implant 134 may take other forms. For example, the occlusive implant 134 may be an expandable balloon element. Some illustrative occlusive implants are described in commonly assigned U.S. Patent Application No. 62/607,053 filed on Dec. 18, 2017 and titled "OCCLUSIVE DEVICE WITH EXPANDABLE MEMBER," and U.S. Patent Application No. 62/675,593 filed on May 23, 2018 and titled "OCCLUSIVE DEVICE WITH EXPANDABLE MEMBER," the disclosures of which are hereby incorporated by reference. In some embodiments, the occlusive implant 134 may include a woven, braided and/or knitted material, a fiber, a sheet-like material, a metallic or polymeric mesh, or other suitable construction. In some cases, the occlusive implant 134 may include a plurality of axially extending struts and/or a plurality of cells. Further, in some embodiments, the occlusive implant 134 may prevent thrombi (e.g., blood clots, etc.) originating in the left atrial appendage from passing through the occlusive implant 134 and into the blood stream. In some embodiments, the occlusive implant 134 may promote endothelial growth after implantation, thereby effectively removing the left atrial appendage from the patient's circulatory system.

The frame structure 152 may be cut and heat-set to form a self-expanding nitinol structure made from a network of axially extending and/or interconnected ribs or struts. The proximal end 154 of the occlusive implant 134 may be configured to releasably couple to or adjacent to the distal end 118 of the elongate body 114. In some embodiments, the occlusive implant 134 may include an internally threaded collar 160. The collar 160 may be configured to receive a threaded insert (not explicitly shown) such that occlusive implant 134 may be deployed or released from the catheter 102 by twisting the threaded insert. However, other coupling mechanisms may be used as desired. In some embodiments, the collar 160 may be electrically conductive and configured to receive or transmit electrical signals to and/or from the occlusive implant 134 via a coupling mechanism 174. In some embodiments, the occlusive implant 134 may be configured as mapping electrodes, impedance measuring electrodes and/or ablation electrodes.

The frame structure 152 may further include one or more fixation mechanisms (not explicitly shown) configured to engage adjacent tissue distributed about a circumference of the occlusive implant 134. The fixation mechanisms may be configured to secure the occlusive implant 134 at a desired location and may include barbs, hooks, surface texture, bristles, etc. Some illustrative fixation mechanisms are described in commonly assigned U.S. Patent Application No. 62/607,053 filed on Dec. 18, 2017 and titled "OCCLUSIVE DEVICE WITH EXPANDABLE MEMBER," the disclosure of which is hereby incorporated by reference.

Figure 3:
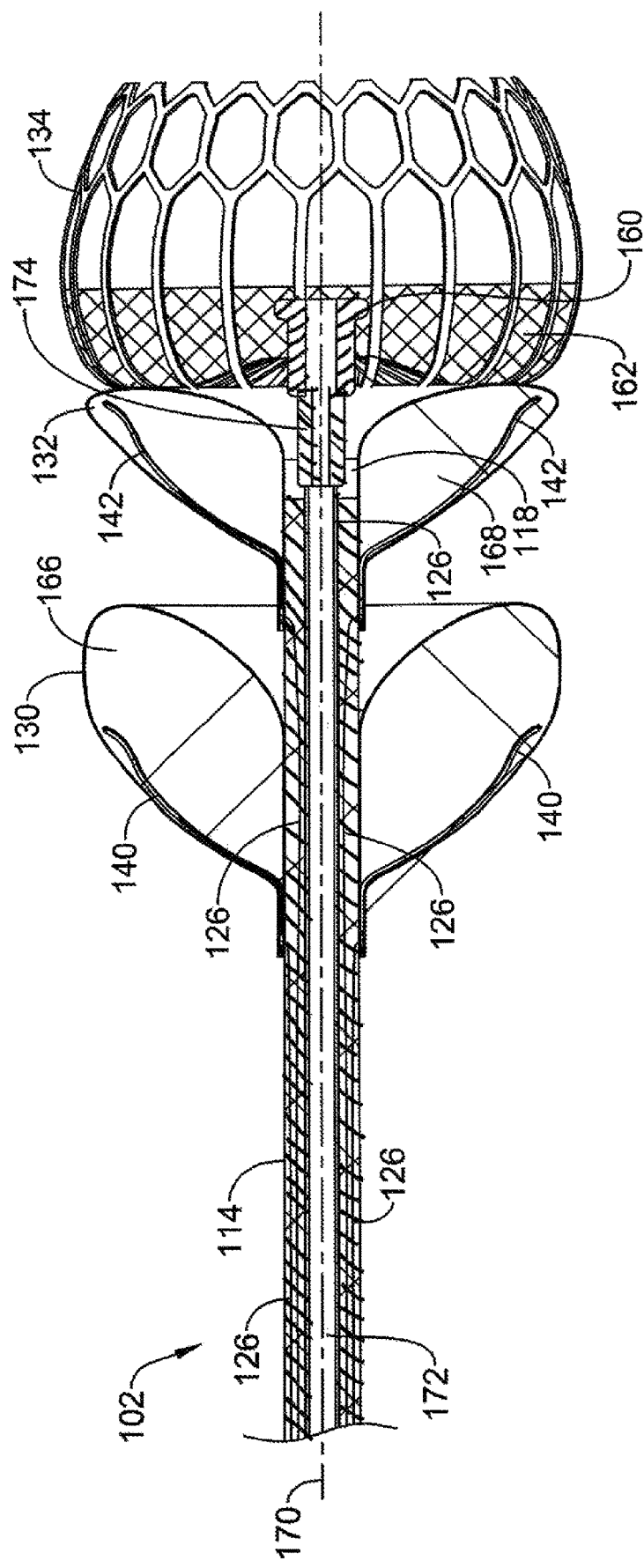
FIG. 3 illustrates a cross-sectional view along line 3-3 of FIG. 2.

The occlusive implant 134 may further include a mesh filter membrane 162. The mesh filter membrane 162 may be formed from a polyethylene terephthalate (PET) knit material that is heat set to form a concave shape that fits over the proximal portion 164 of the occlusive implant 134. The mesh filter membrane 162 may be configured to prevent thrombi from exiting the LAA and entering the heart and/or bloodstream. The mesh filter membrane 162 may promote cellular growth along the surface thereof. For example, the mesh filter membrane 162 may include elements which promote endothelial growth along the surface thereof. For example, the endothelial growth elements may accelerate the ability for endothelial cellular tissue to form a seal across an opening of the left atrial appendage FIG. 3 is a partial cross-sectional view the distal end region 104 of the catheter 102 of the ablation and implant system 100, taken at line 3-3 in FIG. 2. The proximal expandable member 130, the distal expandable member 132, and the occlusive implant 134 may be positioned along a longitudinal axis 170 of the catheter 102 with the occlusive implant 134 positioned distal to the distal expandable member 132 and the distal expandable member 132 distal to the proximal expandable member 130. As shown in FIG. 3, the electrode structures 140, 142 may be positioned within an interior cavity 166, 168 of the proximal expandable member 130 and the distal expandable member 132, respectively. However, it is contemplated that one or both electrode structures 140, 142 may be positioned on an exterior surface of the proximal expandable member 130 or the distal expandable member 132, as desired.

The proximal expandable member 130 and the distal expandable member 132 may be in fluid communication with a fluid delivery lumen 172. The lumen 172 may be used to convey the one or more liquids from the source external to the patient to the proximal expandable member 130 and/or the distal expandable member 132 to expand the proximal expandable member 130 and/or the distal expandable member 132 from a collapsed delivery configuration having a reduced profile to the expanded configuration illustrated in FIG. 3. The proximal and distal expandable members 130, 132 may be configured to conform to the surrounding tissue upon expansion. While not explicitly shown, the elongate body 114 may include a plurality of lumens. For example, the elongate body 114 may include a first fluid delivery lumen in fluid communication with the proximal expandable member 130, a second fluid delivery lumen in fluid communication with the distal expandable member 132 and a guidewire lumen. The plurality of lumens may be arranged co-axially (e.g., a tube within a tube) or side-by-side, as desired. Providing separate inflation lumens for the proximal expandable member 130 and the distal expandable member 132 may allow the proximal expandable member 130 and the distal expandable member 132 to be expanded separately. The guidewire lumen may extend an entire length of the catheter 102 or may be arranged as a rapid exchange device, as desired.

The electrode structures 140, 142 may be electrically coupled to one or more conductive wires 126. The conductive wires 126 may be electrically coupled to the RF generator or direct current source exteriorly coupled to the ablation system 100. The occlusive implant 134 may also be electrically coupled with one more conductive wires 126.

The catheter 102 may include a coupling structure 174 coupled to or extending from a distal end 118 of the elongate body 114. The coupling structure 174 may be configured to releasably couple the occlusive implant 134 to the catheter 102. For example, when the occlusive implant 134 is provided with a threaded collar 160, the coupling structure 174 may be configured to threadably engage the collar 160. In some cases, the coupling structure may be actuatable separate from the elongate body 114.

It is contemplated that the catheter 102 may be configured to be customizable for a desired application. For example, the catheter 102 may include the proximal expandable member 130, the distal expandable member 132 and one or more attachment mechanisms for attaching the occlusive implant 134. For example, when ablation is desired in the pulmonary vein but no implant is to be placed in the LAA, the system 100 may include the proximal and distal expandable members 130, 132. In another example, when ablation is desired at the ostium of the LAA and an occlusive device is to be implanted, but no ablation is desired at the pulmonary vein (or other target location), the system 100 may include one or more of the proximal or distal expandable members 130, 132 and the occlusive implant 134. It is contemplated that that in this example one of the proximal or distal expandable members 130, 132 may remain uninflated or the catheter 102 may include only one of the proximal or distal expandable members 130, 132. In yet another example, when ablation is desired at the ostium of the LAA and an occlusive device is to be implanted, and ablation is desired at the pulmonary vein (or other target location), the system 100 may include the proximal expandable member 130, the distal expandable member 132, and the occlusive implant 134.

Figure 4:
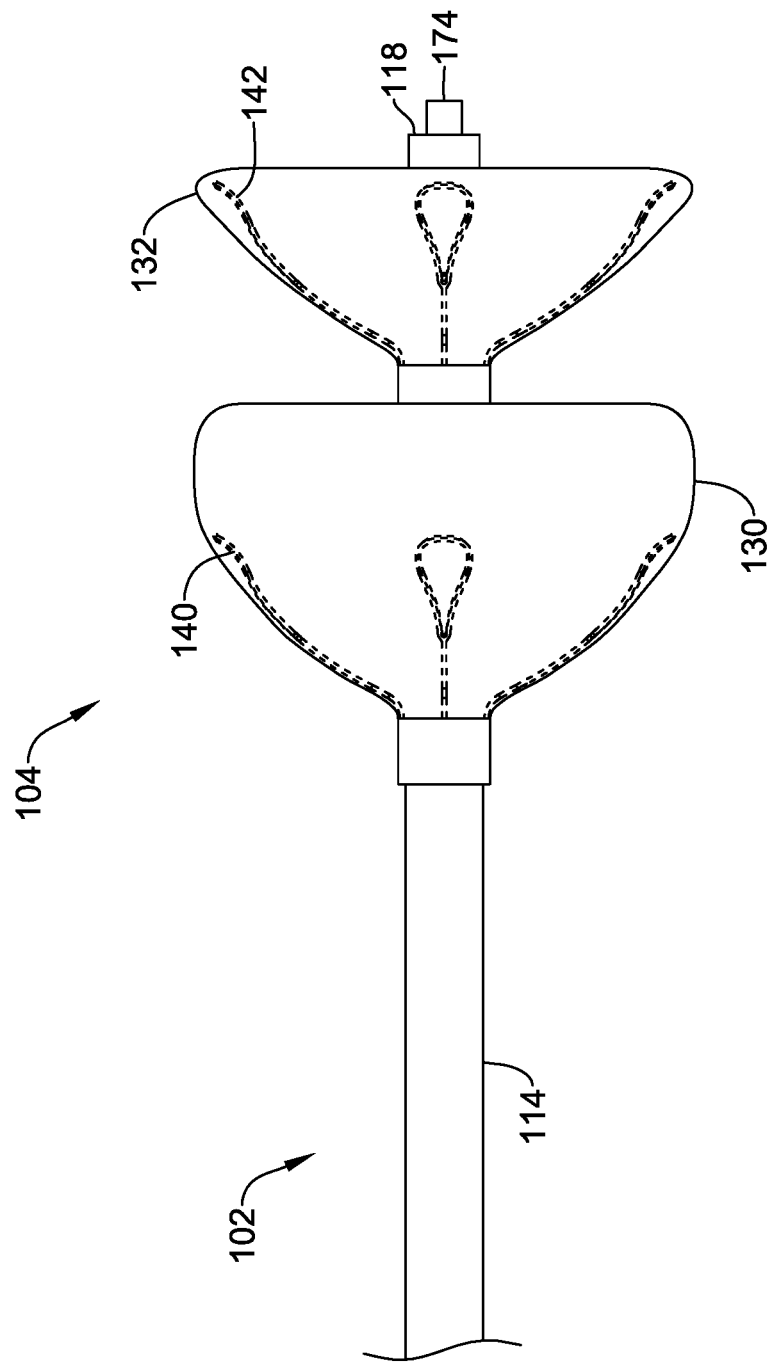
FIG. 4 illustrates a side view of a distal end region of another example ablation system configuration.

FIG. 4 illustrates a side view of the distal end region 104 of the catheter 102 of the ablation and implant system 100 configured with the proximal expandable member 130 and the distal expandable member 132. The configuration illustrated in FIG. 4 may be utilized to ablate the ostium of the LAA and/or a target region near the ostium of the LAA, a pulmonary vein and/or other target region. In one example, the configuration illustrated in FIG. 4 may be used to perform ablation when no occlusive implant is desired or when a clinician prefers to perform ablation without the occlusive implant 134 present. It is contemplated that once the ablation is complete, the system 100 may be removed from the body and the occlusive implant 134 coupled to the coupling structure 174 and advanced and deployed to the LAA using a technique similar to that described herein with respect to FIGS. 7 and 8. Alternatively, the occlusive implant 134 may be advanced and deployed to the LAA using a separate delivery system (e.g., separate from the ablation system 100).

Figure 5:
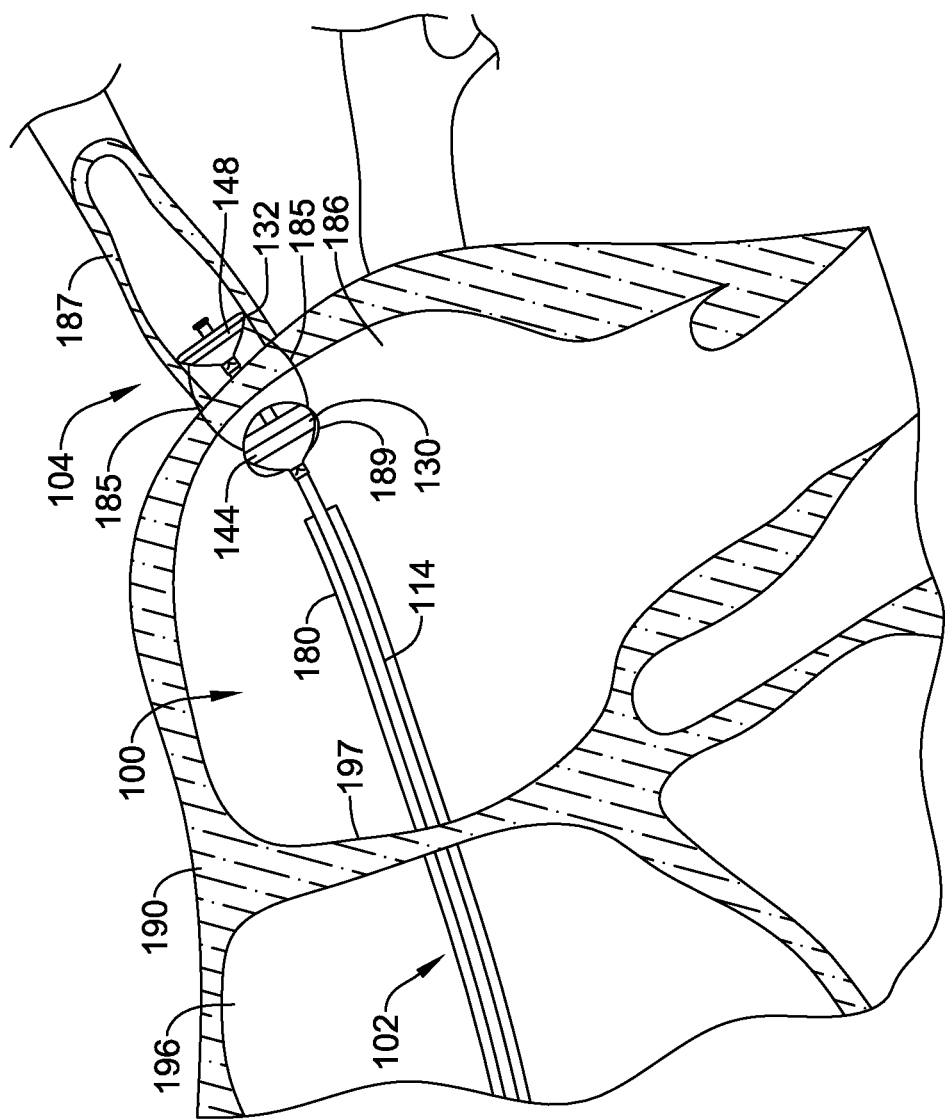
FIG. 5 illustrates the example ablation system of FIG. 4 being positioned within an opening of the pulmonary vein.

FIG. 5 shows the ablation system 100 configuration of FIG. 4 at a target tissue region at a pulmonary vein 187 of a patient's heart 190. More specifically, the heart 190 shown in FIG. 5 may be undergoing an ablation and implant procedure using a system 100 in accordance with various aspects discussed herein. The distal end region 104 of the catheter 102 may be positioned within a pulmonary vein 187. In some embodiments, the proximal expandable member 130 and the distal expandable member 132 may be both positioned within the pulmonary vein 187. In other embodiments, the proximal expandable member 130 may be positioned at, near, or within the ostium 189 of the pulmonary vein 187 and the distal expandable member 132 positioned within the pulmonary vein 187. The position of the proximal and/or expandable members 130, 132 may be varied depending on the desired target location for the ablation procedure. More specifically and in certain instances, the catheter 102 may enter the right atrium 196 of heart 190 through a femoral vein (not explicitly shown) and the inferior vena cava (not explicitly shown). The catheter 102 may be passed through a puncture in an atrial septum 197 to access left atrium 186. From the left atrium 186, the distal end region 104 of the catheter 102 may be positioned through any of the pulmonary vein ostia to enter a pulmonary vein such as pulmonary vein 187. In some instances, the catheter 102 may be advanced within a guide or delivery sheath 180. Further, while not explicitly shown, the catheter 102 and/or delivery sheath 180 may be advanced over or along with a guidewire.

In some embodiments, the catheter 102 and/or the delivery sheath 180 may be provided with one or more radiopaque markers. The radiopaque markers may facilitate positioning of the proximal and/or distal expandable members 130, 132. Once the proximal and/or distal expandable members 130, 132 is adjacent to the treatment region, the delivery sheath 180 may be proximally retracted. An inflation fluid from one or more fluid sources (not shown) located outside the patient's body may be provided to the proximal expandable member 130 and/or the distal expandable member 132 (e.g., separately or substantially simultaneously) to expand the proximal expandable member 130 and/or the distal expandable member 132 to the inflated or enlarged configuration illustrated in FIG. 8. The inflation medium may be saline, a pharmacological agent, or a combination thereof, as desired. The inflation of proximal expandable member 130 may cause the outer surface of first permeable region 144 to contact or be positioned adjacent to an inner wall of the pulmonary vein 187. Similarly, the inflation of distal expandable member 132 may cause the outer surface of first permeable region 148 to contact or be positioned adjacent to an inner wall of the pulmonary vein 187.

Ablation energy may be provided from an ablation energy source (not explicitly shown) through the conductive wires (not explicitly shown) and to the electrode structures (not explicitly shown) within the proximal expandable member 130 to initiate modulation of target neural fibers. As described above, the inflation fluid may weep or elute from the permeable region 144 of the proximal expandable member 130. The ablation energy may be applied through one or more portions of the proximal expandable member 130 by an electric field generated by the external source/controller (not shown) and transferred through wires within one or more lumens of the elongate body 114 to electrodes (not shown) arranged with the proximal expandable member 130. The electric energy 185 can be transmitted to the inner wall of pulmonary vein 187 from the electrodes within the proximal expandable member 130 via the liquid (e.g., saline, pharmacological agent, contrast, or mixture thereof) that permeates from the exterior surface of proximal expandable member 130 (or directly from electrodes on the surface of proximal expandable member 130, if so provided). The electrode structures in the distal expandable member 132 may be configured to form a ground or a closed loop with the electrode structures of the proximal expandable member 130. The reverse configuration is also contemplated in which electrical energy is delivered to the distal expandable member 132 and the electrode structures in the proximal expandable member form a ground or closed loop. It is contemplated that the proximal expandable member 130 and the distal expandable member 132 may be configured to receive different electric signals. For example, one may be configured with positive electrodes and the other with negative electrodes.

The electric field may modulate the activity along neural fibers within the wall of the pulmonary vein 187 by at least partially causing apoptotic cell death to the tissue receiving the ablation energy. For example, direct current may be delivered in small pulse widths at a voltage in the range of about 1000 to about 5000 volts. The pulse(s) may be delivered in the refractory period of the heartbeat. The number of pulses per heart beat (e.g. in a burst) and the total number of bursts may be set by the physician. For example, in the range of about 1 to about 100 pulses may be delivered per heart beat (e.g. in a burst). The number of pulses per heart beat may be dependent on the length of the pulse such that the pulses are delivered during the refractory period. In some instances, in the range of about 10 to about 1000 pulses may be delivered over the total electroporation period. This non-thermal ablation technique may form pores in the membranes of the adjacent cells and eventually apoptotic cell death. However, thermal ablation techniques using, for example, radiofrequency ablation, may also be used. In certain instances while the electric field for ablation is being applied, transmission of the liquid (e.g., saline or pharmacological agent) from the proximal and/or distal expandable members 130, 132 to the tissue can be continued. The ablation process may be performed simultaneously and concurrently with the delivery of an antimitotic pharmacological agent to the tissue receiving the ablation energy or the ablation process can be performed sequentially with the delivery of the liquid.

Delivering a pharmacological agent prior to the ablative energy may provide iontophoresis-like action to drive the agent into the tissue. Delivering the ablative energy prior to the pharmacological agent can provide some electroporative disruption of the endothelial cell-to-cell junction, and thereby promote delivery of the agent. In certain instances, a repetitious cyclic delivery of ablative energy and the pharmacological agent may enhance uptake of the agent. In certain instances, the pharmacological agent can have an ionic base so as to optimize the ablative energy's ability to get the agent beyond the endothelium of the tissue. Paclitaxel is an example of one type of antimitotic pharmacological agent that may be used with the apparatuses, systems, and methods discussed herein. This technique of coordinating the delivery of paclitaxel with the ablation process may prevent or reduce the occurrence of fibrosis, stenosis, and neointimal hyperplasia of the tissue undergoing ablation.

As described herein, in some embodiments, the electric field may be generated by applying direct current to the one or more electrodes arranged within the proximal expandable member 130 and/or the distal end expandable member 132. Application of direct current, which is athermal, may be less likely to cause stenosis as compared to RF ablation. In certain instances, the amount of anti-stenotic pharmaceutical agent released from the proximal expandable member 130 and/or the distal end expandable member 132 may be tailored based on the type of energy used for ablation (e.g., a greater amount of anti-stenotic for RF ablation as compared to the amount of anti-stenotic for direct current). In addition, the use of direct current may cause apoptotic cell death to the tissue receiving the ablation energy. The direct current may form pores in the cells of the wall of the pulmonary vein 187 that are irreversible (e.g., the pores do not close). The proximal expandable member 130 and/or the distal end expandable member 132 being in contact with the wall of the pulmonary vein 187 may provide controlled and direct ablation of a target area while mitigating against down-stream proliferation of the ablation energy. In some embodiments, the electrode structures in the proximal expandable member 130 and/or the distal expandable member 132 may map the electrical activity in the adjacent tissue region to confirm that electrical signals are no longer being conducted.

Once the ablation procedure is complete in the pulmonary vein, the proximal and distal expandable members 130, 132 may be deflated and repositioned to the ostium of the LAA. The proximal and distal expandable members 130, 132 may be inflated and the ablation procedure performed in or near the ostium of the LAA. It is contemplated that the ablation procedure need not be performed on both the pulmonary vein and the ostium of the LAA. In some embodiments, the ablation system configuration of FIG. 4 may be used to ablate only one of the pulmonary vein and the ostium of the LAA or may be used to ablate more than a single pulmonary vein, as desired or necessary. After the ablation procedure(s) are complete, an occlusive implant, such as the occlusive implant 134 described herein, may be positioned and deployed within the LAA. In some cases, the occlusive implant 134 may be positioned prior to performing the ablation procedure at the LAA and uncoupled from the device after the ablation procedure. It is further contemplated that the LAA may be ablated (with or without deploying an implant 134) prior to performing the ablation procedure in or near the pulmonary vein.

Figure 6:
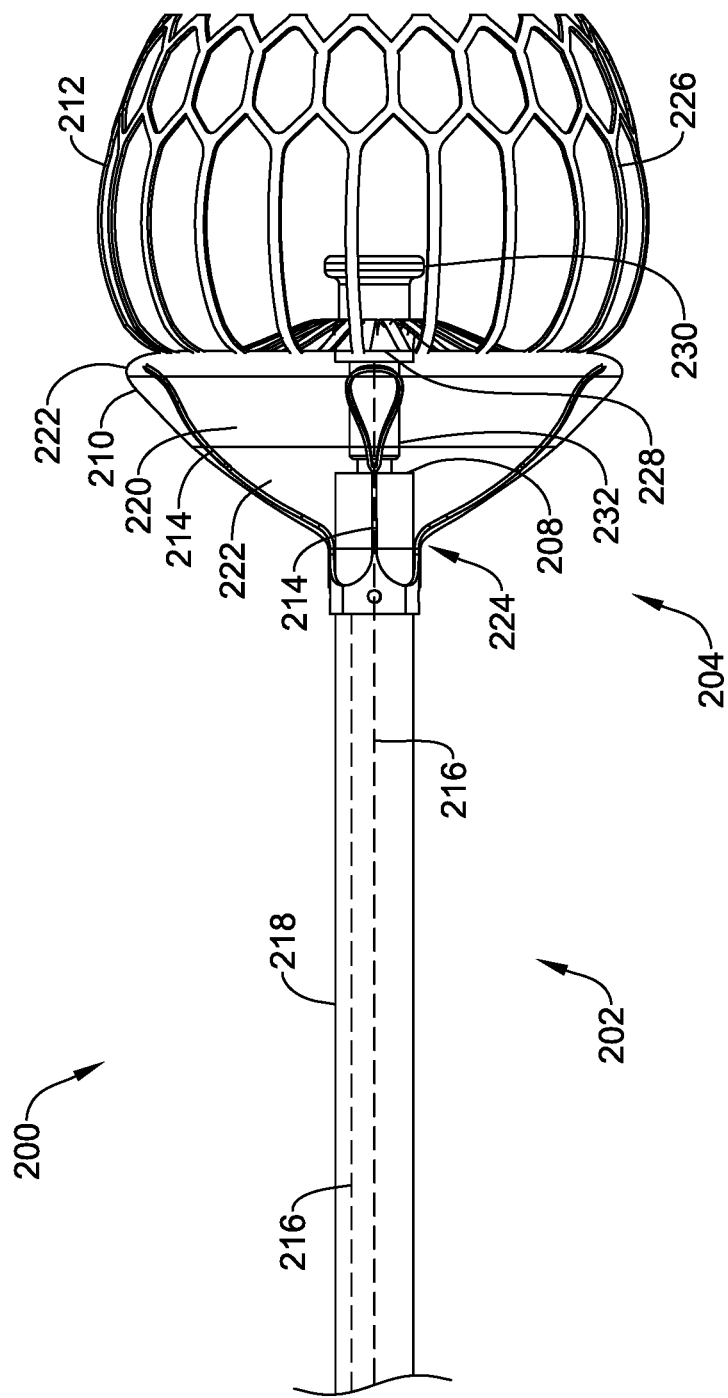
FIG. 6 illustrates a side view of a distal end region of another example ablation and implant system configuration.

FIG. 6 illustrates a side view of a distal end region 204 of another illustrative catheter 202 of the ablation and implant system 200. The catheter 202 may be similar in form and function to the catheter 202 described herein. The distal end region 204 of the catheter 202 may include an expandable member 210 and an occlusive implant 212. The configuration illustrated in FIG. 6 may be utilized to ablate the ostium of the LAA and/or a target region near the ostium of the LAA while placing an occlusive implant in the LAA.

The expandable member 210 may be similar in form and function to the proximal or distal expandable members 130, 132 described herein. The expandable member 210 may include one or more electrode structures 214. The electrode structures 214 and/or the occlusive implant 212 may be configured to conduct radio frequency (RF) energy or direct current to form lesions during the ablation procedure. The electrode structures 214 and/or the occlusive implant 212 may deliver ablation energy (and/or complete the circuit) to the LAA or adjacent tissue to reduce or eliminate contractions in the LAA that may dislodge an occlusive implant, such as the occlusive implant 212. Each of the electrode structures 214 and/or the occlusive implant 212 may be coupled to the wires 216 using suitable means, such as soldering or welding. In some embodiments, the wires 216 can pass through a lumen (not explicitly shown) extending through an elongate body 218 of the catheter 202. In other embodiments, the wires 216 may be embedded within a side wall of the elongate body 218. The wires 216 may be electrically coupled to the RF generator or direct current source exteriorly coupled to the ablation system 200. In some instances, the occlusive implant 212 may be formed from a conductive material, or include conductive regions to form a ground or return path.

The distal end region 204 may be configured to ablate the LAA, or other target tissue, in a manner that does not cause harmful damage to surrounding tissues. In some instances, the ablation method may include irreversible electroporation (IRE). IRE is a safe controlled non-thermal ablation technique that uses nano-second to micro-second high voltage pulses to form pores in the membranes of the adjacent cells. In some instances, the pulses may be in the range of about 1 to about 100 microseconds. However, the pulses may be shorter than 1 microsecond (e.g., in the nanosecond range) or longer than 100 microseconds, as desired. Further, the pulses may be monopolar or bipolar pulses. If the pores become wide enough, the cell is unable to repair itself and dies naturally (e.g., apoptotic cell death). This technique may allow for endothelization to occur over and/or around the occlusive implant 212. However, other ablation techniques may also be used. As will be described in more detail herein, the LAA may be ablated using IRE before installation of the occlusive implant 212.

As described above, the distal end region 204 of the catheter 202 may include an expandable member 210 and an occlusive implant 212. The expandable member 210 may be expanded from a collapsed delivery configuration (not explicitly shown) to the expanded configuration illustrated in FIG. 6. The expandable member 210 may include one or more electrode structures 214 positioned within an interior of the expandable member 210. The electrode structures 214 may be arranged about a circumference of an interior surface of the expandable member 210. In some instances, the electrode structures 214 may be spaced equidistantly about the circumference of the expandable member 210 while in other instances, the electrode structures 214 may be eccentrically spaced, as desired. The electrode structures 214 may be configured as mapping electrodes, impedance measuring electrodes, and/or ablation electrodes. In one illustrative embodiment, one or both sets of the electrode structures 214 and/or the occlusive implant 212 may also be configured to measure the localized intracardial electrical activity (e.g., map) in real time at the point of RF energy delivery.

In some instances, the expandable member 210 may include regions of differing permeability. For example, the expandable member 210 may include a first region 220 having a first permeability and one or more second regions 222 having a second permeability. The first permeability may differ from the second permeability. More specifically, the first permeability may be greater than the second permeability such that a liquid may exude, elute, weep, or otherwise be transmitted from or through the first region 220. As a result and in certain instances, the first region 220 of the expandable member 210 may be configured to permeate a liquid therethrough. As the expandable member 210 is inflated, the liquid may permeate therethrough at the first region 220. The liquid may be saline, a pharmacological agent, an anti-stenotic agent, contrast, or a combination thereof. In some embodiments, the first region 220 may be an annular region positioned over or adjacent to the electrode structures 214 such that an electrical current may be conducted from (or to) the electrode structures 214 to (or from) another electrically conductive element (e.g., the occlusive implant 212). For example, the liquid permeating from the first region 220 may be electrically conductive so as to provide an electrical path from the electrode structures 214 positioned interior of the expandable member 210 to a point exterior to the expandable member 210 or from a point exterior of the expandable member 210 to the electrode structures 214 interior to the expandable member 210. However, it is contemplated that the first region 220 may be positioned in other configurations, as desired. In one example, the first region 220 may extend from a proximal end region 224 of the expandable member 210 to a point adjacent to a distal end region of the electrode structures 214.

The occlusive implant 212 may include a self-expanding frame structure 226. The frame structure 226 may be expandable from a collapsed configuration (not explicitly shown) to the expanded configuration illustrated in FIG. 6. The frame structure 226 may be formed from Nitinol, or other material configured to resume a predetermined shape in the absence of an applied force. While the occlusive implant 212 is described and shown as having a frame structure 226, it is contemplated that the occlusive implant 212 may take other forms. For example, the occlusive implant 212 may be an expandable balloon element.

In some embodiments, the occlusive implant 212 may include a woven, braided and/or knitted material, a fiber, a sheet-like material, a metallic or polymeric mesh, or other suitable construction. Further, in some embodiments, the occlusive implant 212 may prevent thrombi (e.g., blood clots, etc.) originating in the left atrial appendage from passing through the occlusive implant 212 and into the blood stream. In some embodiments, the occlusive implant 212 may promote endothelial growth after implantation, thereby effectively removing the left atrial appendage from the patient's circulatory system.

The frame structure 226 may be cut and heat-set to form a self-expanding nitinol structure made from a network of interconnected ribs or struts. The proximal end 228 of the occlusive implant 212 may be configured to releasably couple to or adjacent to the distal end 208 of the elongate body 218. In some embodiments, the occlusive implant 212 may include an internally threaded collar 230. The collar 230 may be configured to receive a threaded insert (not explicitly shown) such that occlusive implant 212 may be deployed or released from the catheter 202 by twisting the threaded insert. However, other coupling mechanisms may be used as desired. In some embodiments, the collar 230 may be electrically conductive and configured to receive or transmit electrical signals to and/or from the occlusive implant 212 via a coupling mechanism 232. In some embodiments, the occlusive implant 212 may be configured as mapping electrodes, impedance measuring electrodes and/or ablation electrodes.

Figure 7:
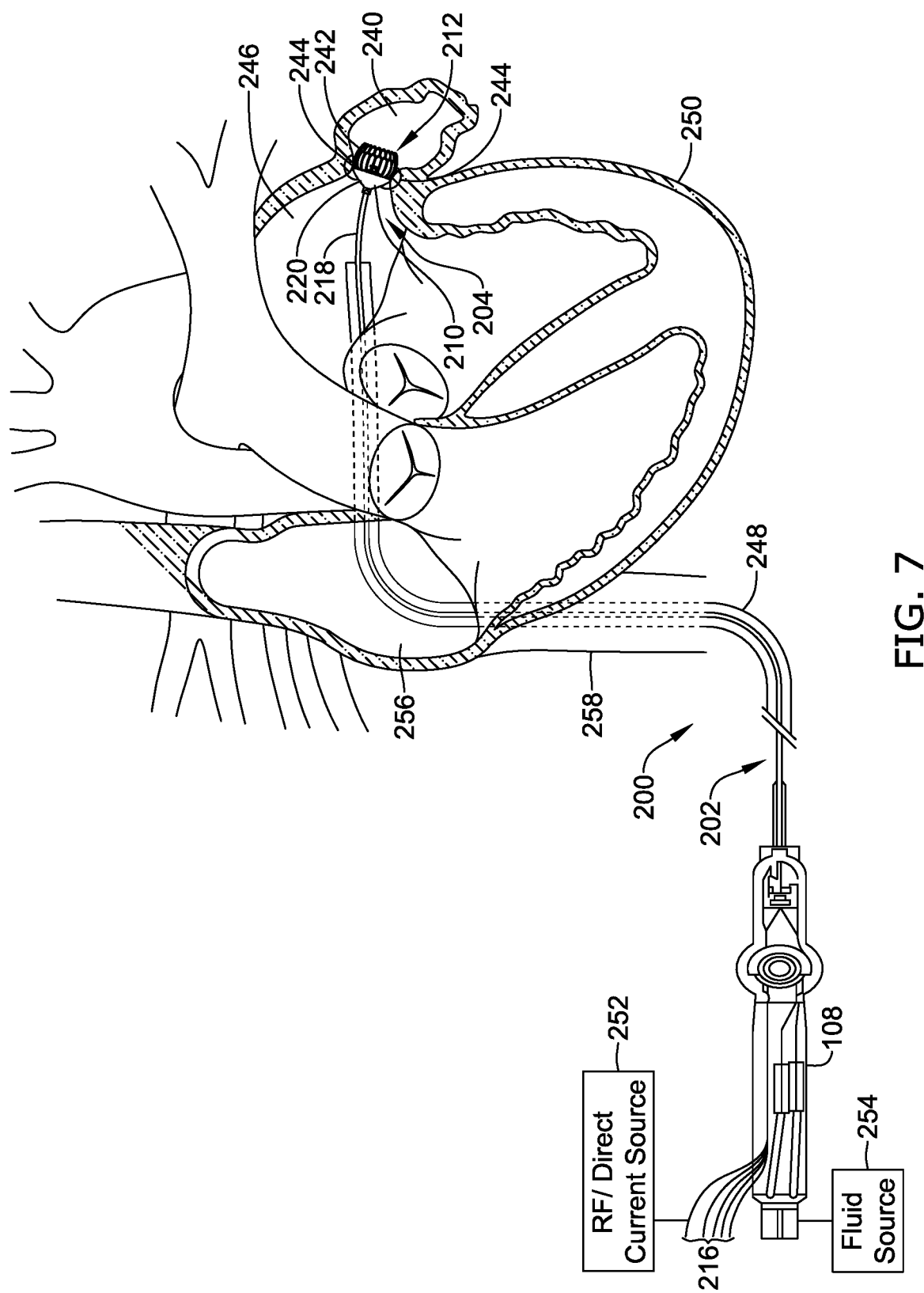
FIGS. 7-8 illustrate the example ablation and implant system of FIG. 4 being positioned within an opening of the left atrial appendage.

FIG. 7 shows the ablation system configuration of FIG. 6 at a target tissue region at the ostium 242 of the LAA of a patient's heart 250. More specifically, the heart 250 shown in FIG. 7 may be undergoing an ablation and implant procedure using a system 200 in accordance with various aspects discussed herein. The distal end region 204 of the catheter 202 may be positioned within the left atrium 246 of the patient's heart 250. More specifically and in certain instances, the catheter 202 may enter the right atrium 256 of heart 250 through a femoral vein (not explicitly shown) and the inferior vena cava 258. The catheter 202 may be passed through a puncture in an atrial septum (not explicitly shown) to access left atrium 246. From the left atrium 246, the distal end region 204 of the catheter 202 may be positioned within the LAA 240 such that the occlusive implant 212 is positioned within the ostium 242 of the LAA 240. The handle assembly 108 may be used to facility navigation of the catheter 202. In some instances, the catheter 202 may be advanced within a guide or delivery sheath 248. Further, while not explicitly shown, the catheter 202 and/or delivery sheath 248 may be advanced over or along with a guidewire. It is contemplated that the delivery sheath 248 may maintain the occlusive implant 212 in a compressed or collapsed configuration until the occlusive implant 212 is at or near the target implant location.

In some embodiments, the catheter 202 and/or the delivery sheath 248 may be provided with one or more radiopaque markers. The radiopaque markers may facilitate deployment of the occlusive implant 212 at the desired location. Once the occlusive implant 212 is adjacent to the desired region of deployment, the delivery sheath 248 may be proximally retracted to allow the occlusive implant to expand to the expanded deployed configuration. An inflation fluid from a fluid source 254 located outside the patient's body may be provided to the expandable member 210 to expand the expandable member 210 to the inflated or enlarged configuration illustrated in FIG. 7. The inflation medium may be saline, a pharmacological agent, contrast, or a combination thereof, as desired. The inflation of expandable member 210 may cause the outer surface of first permeable region 220 to contact or be positioned adjacent to the ostium 242 of the LAA 240. In some instances, the expandable member 210 may be positioned more distally within the LAA. The positioning of the expandable member 210 may be determined based on the desired location of ablation.

Ablation energy may be provided from an ablation energy source 252 through the conductive wires 216 and to the electrode structures (not explicitly shown) within the expandable member 210 to initiate modulation of target neural fibers. As described above, the inflation fluid may weep or elute from the permeable region 220 of the expandable member 210. The ablation energy may be applied through one or more portions of the expandable member 210 by an electric field generated by the external source/controller 252 and transferred through wires 216 within one or more lumens of the elongate body 218 to electrodes (not shown) arranged with the expandable member 210. The electric energy 244 can be transmitted to the inner wall of ostium 242 of the LAA 240 from the electrodes within the expandable member 210 via the liquid (e.g., saline or pharmacological agent) that permeates from the exterior surface of expandable member 210 (or directly from electrodes on the surface of expandable member 210, if so provided). The occlusive implant 212 may have an electrically conductive region configured to form a ground or a closed loop with the electrode structures of the expandable member 210.

The electric field may modulate the activity along neural fibers within the wall of the ostium 242 of the LAA 240 by at least partially causing apoptotic cell death to the tissue receiving the ablation energy. For example, direct current may be delivered in small pulse widths at a voltage in the range of about 1000 to about 5000 volts. The pulse(s) may be delivered in the refractory period of the heartbeat. The number of pulses per heart beat (e.g. in a burst) and the total number of bursts may be set by the physician. For example, in the range of about 1 to about 100 pulses may be delivered per heart beat (e.g. in a burst). The number of pulses per heart beat may be dependent on the length of the pulse such that the pulses are delivered during the refractory period. In some instances, in the range of about 10 to about 1000 pulses may be delivered over the total electroporation period. This non-thermal ablation technique may form pores in the membranes of the adjacent cells and eventually apoptotic cell death. However, thermal ablation techniques using, for example, radiofrequency ablation, may also be used. In certain instances while the electric field for ablation is being applied, transmission of the liquid (e.g., saline or pharmacological agent) from the expandable member 210 to the tissue can be continued. The ablation process may be performed simultaneously and concurrently with the delivery of an antimitotic pharmacological agent to the tissue receiving the ablation energy or the ablation process can be performed sequentially with the delivery of the liquid. In some embodiments, the electrode structures in the expandable member 210 may map the electrical activity in the adjacent tissue region to confirm that electrical signals are no longer being conducted. If necessary, the ablation procedure may be repeated.

Delivering a pharmacological agent prior to the ablative energy may provide iontophoresis-like action to drive the agent into the tissue. Delivering the ablative energy prior to the pharmacological agent can provide some electroporative disruption of the endothelial cell-to-cell junction, and thereby promote delivery of the agent. In certain instances, a repetitious cyclic delivery of ablative energy and the pharmacological agent may enhance uptake of the agent. In certain instances, the pharmacological agent can have an ionic base so as to optimize the ablative energy's ability to get the agent beyond the endothelium of the tissue. Paclitaxel is an example of one type of antimitotic pharmacological agent that may be used with the apparatuses, systems, and methods discussed herein. This technique of coordinating the delivery of paclitaxel with the ablation process may prevent or reduce the occurrence of fibrosis, stenosis, and neointimal hyperplasia of the tissue undergoing ablation.

As described herein, in some embodiments, the electric field may be generated by applying direct current to the one or more electrodes arranged within the expandable member 210. Application of direct current, which is athermal, may be less likely to cause stenosis as compared to RF ablation. In certain instances, the amount of anti-stenotic pharmaceutical agent released from the expandable member 210 may be tailored based on the type of energy used for ablation (e.g., a greater amount of anti-stenotic for RF ablation as compared to the amount of anti-stenotic for direct current). In addition, the use of direct current may cause apoptotic cell death to the tissue receiving the ablation energy. The direct current may form pores in the cells of the wall of the ostium 242 of the LAA 240 that are irreversible (e.g., the pores do not close). The expandable member 210 being in contact with the wall of the ostium 242 may provide controlled and direct ablation of a target area while mitigating against down-stream proliferation of the ablation energy.

Figure 8:
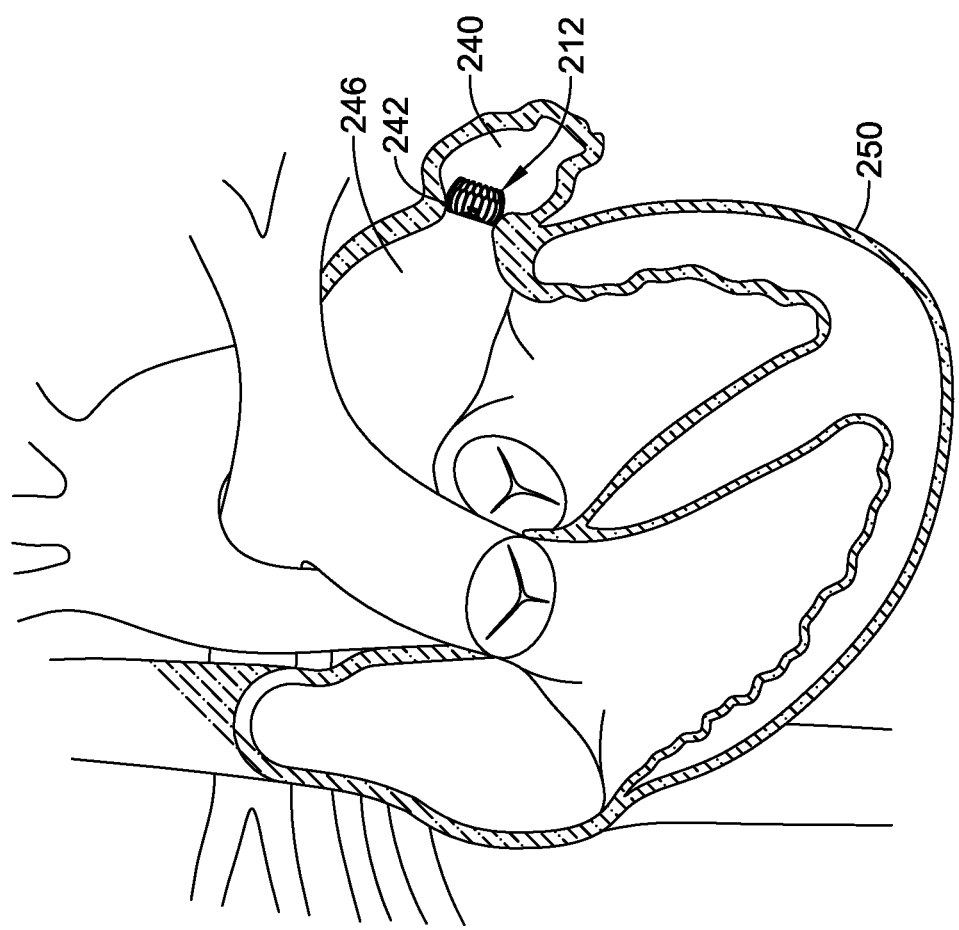

Once the ablation procedure is complete, a position of the occlusive implant 212 may be verified. It is contemplated that the occlusive implant 212 may be retracted into the delivery sheath and repositioned as necessary to correctly position the occlusive implant 212 within the LAA 240 such that the occlusive implant 212 occludes the ostium 242. A contrast agent may be used to verify the occlusive implant is correctly positioned. Once the occlusive implant is correctly positioned, the occlusive implant may be uncoupled from the catheter 202. The catheter 202 and delivery sheath 248 may then be removed from the patient's body while the occlusive implant 212 remains in the LAA 240, as shown in FIG. 8.

It is further contemplated that the ablation system 100 configuration illustrated in FIGS. 2 and 3 including the proximal expandable member 130, the distal expandable member 132, and the occlusive implant 134 may also be used to deliver an ablation therapy and the occlusive implant 134. For example, the system 100 may be delivered to the LAA in a manner similar to that described with respect to FIGS. 7-8. However, the system 100 having the proximal expandable member 130, the distal expandable member 132, and the occlusive implant 134 may include three optional paths of IRE delivery. In a first example, the path may be from the proximal expandable member 130 to the distal expandable member 132. In a second example, the path may be from the proximal expandable member 130 to the occlusive implant 134. In this example, the proximal expandable member 130 may remain collapsed and within the delivery sheath, although this is not required. In a third example, the path may be from the distal expandable member 132 to the occlusive implant 134. After delivery of the ablation therapy to the ostium of the LAA or within the LAA, the occlusive implant 134 may be uncoupled from the catheter shaft 102 and deployed in the LAA. Optionally, the system 100 having the proximal expandable member 130 and the distal expandable member 132 may then be used to deliver an IRE therapy within a pulmonary vein as described with respect to FIG. 4.

The materials that can be used for the various components of the ablation and implant systems 100, 200 (and variations, systems or components thereof disclosed herein) and the various elements thereof disclosed herein may include those commonly associated with medical devices. For simplicity purposes, the following discussion makes reference to the systems 100, 200 (and variations, systems or components disclosed herein). However, this is not intended to limit the devices and methods described herein, as the discussion may be applied to other elements, members, components, or devices disclosed herein.

In some embodiments, the occlusive systems 100, 200 (and variations, systems or components thereof disclosed herein) may be made from a metal, metal alloy, polymer (some examples of which are disclosed below), a metal-polymer composite, ceramics, combinations thereof, and the like, or other suitable material. Some examples of suitable metals and metal alloys include stainless steel, such as 444V, 444L, and 314LV stainless steel; mild steel; nickel-titanium alloy such as linear-elastic and/or super-elastic nitinol; other nickel alloys such as nickel-chromium-molybdenum alloys (e.g., UNS: N06625 such as INCONEL® 625, UNS: N06022 such as HASTELLOY® C-22®, UNS: N10276 such as HASTELLOY® C276®, other HASTELLOY® alloys, and the like), nickel-copper alloys (e.g., UNS: N04400 such as MONEL® 400, NICKELVAC® 400, NICORROS® 400, and the like), nickel-cobalt-chromium-molybdenum alloys (e.g., UNS: R44035 such as MP35-N® and the like), nickel-molybdenum alloys (e.g., UNS: N10665 such as HASTELLOY® ALLOY B2®), other nickel-chromium alloys, other nickel-molybdenum alloys, other nickel-cobalt alloys, other nickel-iron alloys, other nickel-copper alloys, other nickel-tungsten or tungsten alloys, and the like; cobalt-chromium alloys; cobalt-chromium-molybdenum alloys (e.g., UNS: R44003 such as ELGILOY®, PHYNOX®, and the like); platinum enriched stainless steel; titanium; platinum; palladium; gold; combinations thereof; and the like; or any other suitable material.

As alluded to herein, within the family of commercially available nickel-titanium or nitinol alloys, is a category designated "linear elastic" or "non-super-elastic" which, although may be similar in chemistry to conventional shape memory and super elastic varieties, may exhibit distinct and useful mechanical properties. Linear elastic and/or non-super-elastic nitinol may be distinguished from super elastic nitinol in that the linear elastic and/or non-super-elastic nitinol does not display a substantial "superelastic plateau" or "flag region" in its stress/strain curve like super elastic nitinol does. Instead, in the linear elastic and/or non-super-elastic nitinol, as recoverable strain increases, the stress continues to increase in a substantially linear, or a somewhat, but not necessarily entirely linear relationship until plastic deformation begins or at least in a relationship that is more linear than the super elastic plateau and/or flag region that may be seen with super elastic nitinol. Thus, for the purposes of this disclosure linear elastic and/or non-super-elastic nitinol may also be termed "substantially" linear elastic and/or non-super-elastic nitinol.

In some cases, linear elastic and/or non-super-elastic nitinol may also be distinguishable from super elastic nitinol in that linear elastic and/or non-super-elastic nitinol may accept up to about 2-5% strain while remaining substantially elastic (e.g., before plastically deforming) whereas super elastic nitinol may accept up to about 8% strain before plastically deforming. Both of these materials can be distinguished from other linear elastic materials such as stainless steel (that can also be distinguished based on its composition), which may accept only about 0.2 to 0.44 percent strain before plastically deforming.

In some embodiments, the linear elastic and/or non-super-elastic nickel-titanium alloy is an alloy that does not show any martensite/austenite phase changes that are detectable by differential scanning calorimetry (DSC) and dynamic metal thermal analysis (DMTA) analysis over a large temperature range. For example, in some embodiments, there may be no martensite/austenite phase changes detectable by DSC and DMTA analysis in the range of about −60 degrees Celsius (° C.) to about 120° C. in the linear elastic and/or non-super-elastic nickel-titanium alloy. The mechanical bending properties of such material may therefore be generally inert to the effect of temperature over this very broad range of temperature. In some embodiments, the mechanical bending properties of the linear elastic and/or non-super-elastic nickel-titanium alloy at ambient or room temperature are substantially the same as the mechanical properties at body temperature, for example, in that they do not display a super-elastic plateau and/or flag region. In other words, across a broad temperature range, the linear elastic and/or non-super-elastic nickel-titanium alloy maintains its linear elastic and/or non-super-elastic characteristics and/or properties.

In some embodiments, the linear elastic and/or non-super-elastic nickel-titanium alloy may be in the range of about 50 to about 60 weight percent nickel, with the remainder being essentially titanium. In some embodiments, the composition is in the range of about 54 to about 57 weight percent nickel. One example of a suitable nickel-titanium alloy is FHP-NT alloy commercially available from Furukawa Techno Material Co. of Kanagawa, Japan. Other suitable materials may include ULTANIUM™ (available from Neo-Metrics) and GUM METAL™ (available from Toyota). In some other embodiments, a superelastic alloy, for example a superelastic nitinol can be used to achieve desired properties.

In at least some embodiments, portions or all of the systems 100, 200 (and variations, systems or components thereof disclosed herein) may also be doped with, made of, or otherwise include a radiopaque material. Radiopaque materials are understood to be materials capable of producing a relatively bright image on a fluoroscopy screen or another imaging technique during a medical procedure. This relatively bright image aids a user in determining the location of the systems 100, 200 (and variations, systems or components thereof disclosed herein). Some examples of radiopaque materials can include, but are not limited to, gold, platinum, palladium, tantalum, tungsten alloy, polymer material loaded with a radiopaque filler, and the like. Additionally, other radiopaque marker bands and/or coils may also be incorporated into the design of the systems 100, 200 (and variations, systems or components thereof disclosed herein) to achieve the same result.

In some embodiments, a degree of Magnetic Resonance Imaging (MRI) compatibility is imparted into the systems 100, 200 (and variations, systems or components thereof disclosed herein). For example, the systems 100, 200 (and variations, systems or components thereof disclosed herein) and/or components or portions thereof, may be made of a material that does not substantially distort the image and create substantial artifacts (e.g., gaps in the image). Certain ferromagnetic materials, for example, may not be suitable because they may create artifacts in an MRI image. The systems 100, 200 (and variations, systems or components disclosed herein) or portions thereof, may also be made from a material that the MRI machine can image. Some materials that exhibit these characteristics include, for example, tungsten, cobalt-chromium-molybdenum alloys (e.g., UNS: R44003 such as ELGILOY®, PHYNOX®, and the like), nickel-cobalt-chromium-molybdenum alloys (e.g., UNS: R44035 such as MP35-N® and the like), nitinol, and the like, and others.

In some embodiments, the systems 100, 200 (and variations, systems or components thereof disclosed herein) and/or portions thereof, may be made from or include a polymer or other suitable material. Some examples of suitable polymers may include copolymers, polyisobutylene-polyurethane, polytetrafluoroethylene (PTFE), ethylene tetrafluoroethylene (ETFE), fluorinated ethylene propylene (FEP), polyoxymethylene (POM, for example, DELRIN® available from DuPont), polyether block ester, polyurethane (for example, Polyurethane 85A), polypropylene (PP), polyvinylchloride (PVC), polyether-ester (for example, ARNITEL® available from DSM Engineering Plastics), ether or ester based copolymers (for example, butylene/poly(alkylene ether) phthalate and/or other polyester elastomers such as HYTREL® available from DuPont), polyamide (for example, DURETHAN® available from Bayer or CRISTAMID® available from Elf Atochem), elastomeric polyamides, block polyamide/ethers, polyether block amide (PEBA, for example available under the trade name PEBAX®), ethylene vinyl acetate copolymers (EVA), silicones, polyethylene (PE), Marlex high-density polyethylene, Marlex low-density polyethylene, linear low density polyethylene (for example REXELL®), polyester, polybutylene terephthalate (PBT), polyethylene terephthalate (PET), polytrimethylene terephthalate, polyethylene naphthalate (PEN), polyetheretherketone (PEEK), polyimide (PI), polyetherimide (PEI), polyphenylene sulfide (PPS), polyphenylene oxide (PPO), poly paraphenylene terephthalamide (for example, KEVLAR®), polysulfone, nylon, nylon-12 (such as GRILAMID® available from EMS American Grilon), perfluoro(propyl vinyl ether) (PFA), ethylene vinyl alcohol, polyolefin, polystyrene, epoxy, polyvinylidene chloride (PVdC), poly(styrene-b-isobutylene-b-styrene) (for example, SIBS and/or SIBS 50A), polycarbonates, ionomers, polyurethane silicone copolymers (for example, ElastEon® from Aortech Biomaterials or ChronoSil® from AdvanSource Biomaterials), biocompatible polymers, other suitable materials, or mixtures, combinations, copolymers thereof, polymer/metal composites, and the like. In some embodiments, the sheath can be blended with a liquid crystal polymer (LCP). For example, the mixture can contain up to about 6 percent LCP.

In some embodiments, the systems 100, 200 (and variations, systems or components thereof disclosed herein) may include a textile material. Some examples of suitable textile materials may include synthetic yarns that may be flat, shaped, twisted, textured, pre-shrunk or un-shrunk. Synthetic biocompatible yarns suitable for use in the present disclosure include, but are not limited to, polyesters, including polyethylene terephthalate (PET) polyesters, polypropylenes, polyethylenes, polyurethanes, polyolefins, polyvinyls, polymethylacetates, polyamides, naphthalene dicarboxylene derivatives, natural silk, and polytetrafluoroethylenes. Moreover, at least one of the synthetic yarns may be a metallic yarn or a glass or ceramic yarn or fiber. Useful metallic yarns include those yarns made from or containing stainless steel, platinum, gold, titanium, tantalum or a Ni—Co—Cr-based alloy. The yarns may further include carbon, glass or ceramic fibers. Desirably, the yarns are made from thermoplastic materials including, but not limited to, polyesters, polypropylenes, polyethylenes, polyurethanes, polynaphthalenes, polytetrafluoroethylenes, and the like. The yarns may be of the multifilament, monofilament, or spun-types. The type and denier of the yarn chosen may be selected in a manner which forms a biocompatible and implantable prosthesis and, more particularly, a vascular structure having desirable properties.

In some embodiments, the systems 100, 200 (and variations, systems or components thereof disclosed herein) may include and/or be treated with a suitable therapeutic agent. Some examples of suitable therapeutic agents may include anti-thrombogenic agents (such as heparin, heparin derivatives, urokinase, and PPack (dextrophenylalanine proline arginine chloromethylketone)); anti-proliferative agents (such as enoxaparin, angiopeptin, monoclonal antibodies capable of blocking smooth muscle cell proliferation, hirudin, and acetylsalicylic acid); anti-inflammatory agents (such as dexamethasone, prednisolone, corticosterone, budesonide, estrogen, sulfasalazine, and mesalamine); anti-neoplastic/antiproliferative/anti-mitotic agents (such as paclitaxel, 5-fluorouracil, cisplatin, vinblastine, vincristine, epothilones, endostatin, angiostatin and thymidine kinase inhibitors); anesthetic agents (such as lidocaine, bupivacaine, and ropivacaine); anti-coagulants (such as D-Phe-Pro-Arg chloromethyl ketone, an RGD peptide-containing compound, heparin, anti-thrombin compounds, platelet receptor antagonists, anti-thrombin antibodies, anti-platelet receptor antibodies, aspirin, prostaglandin inhibitors, platelet inhibitors, and tick antiplatelet peptides); vascular cell growth promoters (such as growth factor inhibitors, growth factor receptor antagonists, transcriptional activators, and translational promoters); vascular cell growth inhibitors (such as growth factor inhibitors, growth factor receptor antagonists, transcriptional repressors, translational repressors, replication inhibitors, inhibitory antibodies, antibodies directed against growth factors, bifunctional molecules consisting of a growth factor and a cytotoxin, bifunctional molecules consisting of an antibody and a cytotoxin); cholesterol-lowering agents; vasodilating agents; and agents which interfere with endogenous vascoactive mechanisms.

While the discussion above is generally directed toward an occlusive implant for use in the left atrial appendage of the heart, the aforementioned features may also be useful in other types of medical implants where a fabric or membrane is attached to a frame or support structure including, but not limited to, implants for the treatment of aneurysms (e.g., abdominal aortic aneurysms, thoracic aortic aneurysms, etc.), replacement valve implants (e.g., replacement heart valve implants, replacement aortic valve implants, replacement mitral valve implants, replacement vascular valve implants, etc.), and/or other types of occlusive devices (e.g., atrial septal occluders, cerebral aneurysm occluders, peripheral artery occluders, etc.). Other useful applications of the disclosed features are also contemplated.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The disclosure's scope is, of course, defined in the language in which the appended claims are expressed.

What is claimed is:

1. An ablation and implant system, the system comprising:
   a catheter sized and shaped for vascular access and including an elongate body extending between a proximal end and a distal end;
   a first expandable member positioned near the distal end of the elongate body and having a first region configured to permeate a liquid therethrough;
   a first set of one or more electrodes arranged within the first expandable member and configured to deliver energy to the tissue region; and
   an occlusive implant releasably secured to the distal end of the elongate body.

2. The system of claim 1, further comprising:
   a second expandable member and having a first region configured to permeate a liquid therethrough and positioned between the first expandable member and the occlusive implant; and
   a second set of one or more electrodes arranged within the second expandable member.

3. The system of claim 2, wherein the second expandable member is coupled to the elongate body.

4. The system of claim 1, wherein the first region of the first expandable member is configured to transfer energy from the first set of one more electrodes to the tissue region.

5. The system of claim 1, further comprising a direct current source electrically coupled to the first set of one or more electrodes.

6. The system of claim 5, wherein the direct current source is configured to deliver pulses of voltage in the range of about 1000 to about 5000 volts.

7. The system of claim 5, wherein the first set of one or more electrodes is configured to deliver direct current at a rate of about 1 to about 100 pulses per heartbeat.

8. The system of claim 1, wherein the liquid comprises at least one of saline, a pharmacological agent, an anti-stenotic agent, contrast agent, or mixture thereof.

9. The system of claim 1, wherein the liquid is electrically conductive.

10. The system of claim 1, wherein the distal end of the elongate body includes a coupling mechanism configured to releasably engage the occlusive implant, wherein the coupling mechanism extends proximal of a distal end of the first expandable member.

11. The system of claim 1, wherein the one or more electrodes includes a plurality of electrodes each having a free end spaced radially away from the elongate body, wherein the free ends of the plurality of electrodes are spaced apart circumferentially around the elongate body.

12. An ablation and implant system, the system comprising:
    a catheter sized and shaped for vascular access and including an elongate body extending between a proximal end and a distal end;
    a first expandable member positioned near the distal end of the elongate body and having a first region configured to permeate a liquid therethrough;
    a first set of one or more electrodes arranged within the first expandable member and configured to deliver energy to the tissue region; and
    an occlusive implant releasably secured to the distal end of the elongate body;
    wherein the first expandable member and the occlusive implant are each movable between a compressed delivery configuration and an expanded deployed configuration;
    wherein a distal surface of the first expandable member is positioned adjacent or abutting a proximal surface of the occlusive implant in at least the expanded deployed configuration.

13. The system of claim 12, wherein the distal surface of the first expandable member abuts the proximal surface of the occlusive implant in at least one of the compressed delivery configuration or the expanded deployed configuration.

14. The system of claim 12, further comprising:
    a second expandable member having a first region configured to permeate a liquid therethrough and positioned proximal of the first expandable member; and
    a second set of one or more electrodes arranged within the second expandable member.

15. The system of claim 12, wherein the distal end of the elongate body includes a coupling mechanism configured to releasably engage the occlusive implant, wherein the coupling mechanism extends proximal of a distal end of the first expandable member.

* * * * *